US009275570B2

(12) United States Patent
Cai et al.

(10) Patent No.: US 9,275,570 B2
(45) Date of Patent: Mar. 1, 2016

(54) FIELD EMISSION DISPLAY AND DRIVE METHOD FOR THE SAME

(75) Inventors: Qi Cai, Beijing (CN); Xue-Wei Guo, Beijing (CN); You-Hua Lei, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 510 days.

(21) Appl. No.: 13/220,969

(22) Filed: Aug. 30, 2011

(65) Prior Publication Data

US 2012/0169781 A1 Jul. 5, 2012

(30) Foreign Application Priority Data

Dec. 30, 2010 (CN) .......................... 2010 1 0614865

(51) Int. Cl.

*G09G 5/10* (2006.01)
*G06F 3/038* (2013.01)
*G09G 3/22* (2006.01)

(52) U.S. Cl.

CPC .......... *G09G 3/22* (2013.01); *G09G 2310/0202* (2013.01); *G09G 2330/04* (2013.01)

(58) Field of Classification Search

CPC ............ G09G 3/22; G09G 2310/0202; G09G 2330/04
USPC ................... 345/74.1, 87, 690, 204; 348/100; 362/277
See application file for complete search history.

(56) References Cited

U.S. PATENT DOCUMENTS

| | | | | |
|---|---|---|---|---|
| 5,557,322 | A * | 9/1996 | Millward | 348/100 |
| 5,844,531 | A * | 12/1998 | Betsui | 345/74.1 |
| 6,352,357 | B1 * | 3/2002 | Woolard | 362/277 |
| 2002/0057238 | A1 * | 5/2002 | Nitta et al. | 345/87 |
| 2010/0085390 | A1 * | 4/2010 | Saruta | 345/690 |

* cited by examiner

*Primary Examiner* — Robin Mishler
*Assistant Examiner* — Kuo Woo
(74) *Attorney, Agent, or Firm* — Novak Druce Connolly Bove + Quigg LLP

(57) ABSTRACT

A field emission display includes a panel and a control unit. The panel has a number of pixel units. Each of the pixel units has at least one fluorescent layer. The control unit which electrically connects to the pixel units receives an objective image. The control unit further selects a part of the pixel units corresponding to the objective image, divides the part of the pixel units into a number of pixel unit groups, and scans the pixel unit groups to make the plurality of pixel unit groups sequentially work such that the panel displays the objective image.

18 Claims, 5 Drawing Sheets

FIELD EMISSION DISPLAY AND DRIVE METHOD FOR THE SAME

CROSS-REFERENCE TO RELATED APPLICATIONS

This application claims all benefits accruing under 35 U.S.C. §119 from China Patent Application No. 201010614865.9, filed on Dec. 30, 2010 in the China Intellectual Property Office, disclosure of which is incorporated herein by reference.

BACKGROUND

1. Technical Field

The present disclosure relates to a field emission display and a drive method for the same.

2. Description of Related Art

Field emission displays (FEDs) are a novel, rapidly developing flat panel display technology. Compared to conventional displays, such as cathode-ray tube and liquid crystal display, FEDs are superior in providing a wider viewing angle, lower energy consumption, smaller size, and higher quality.

A conventional FED generally includes a number of pixels and a getter. The pixels and the getter are sealed in a vacuum environment. Each of the pixels includes an anode with a surface, a cathode, an emitter electrically connecting to the cathode, and a fluorescent layer disposed on the surface of the anode. When the field emission display is in operation, the cathode provides an electrical potential to the emitter. The emitter emits electrons according to the electrical potential. The anode also provides an electrical potential to accelerate the emitted electrons to bombard the fluorescent layer for luminance. When the fluorescent layer of each of the pixels is bombarded by the electrons, gas is generated. The getter removes the gas to maintain a vacuum environment.

However, when the conventional FED operates to display an image, the pixels corresponding to the objective image will illuminate. The fluorescent layer of each of the pixels corresponding to the objective image also generates gas, thus increasing the amount of gas of the conventional FED.

What is needed, therefore, is to provide a FED and a drive method that can reduce the amount of gas generated from pixels.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
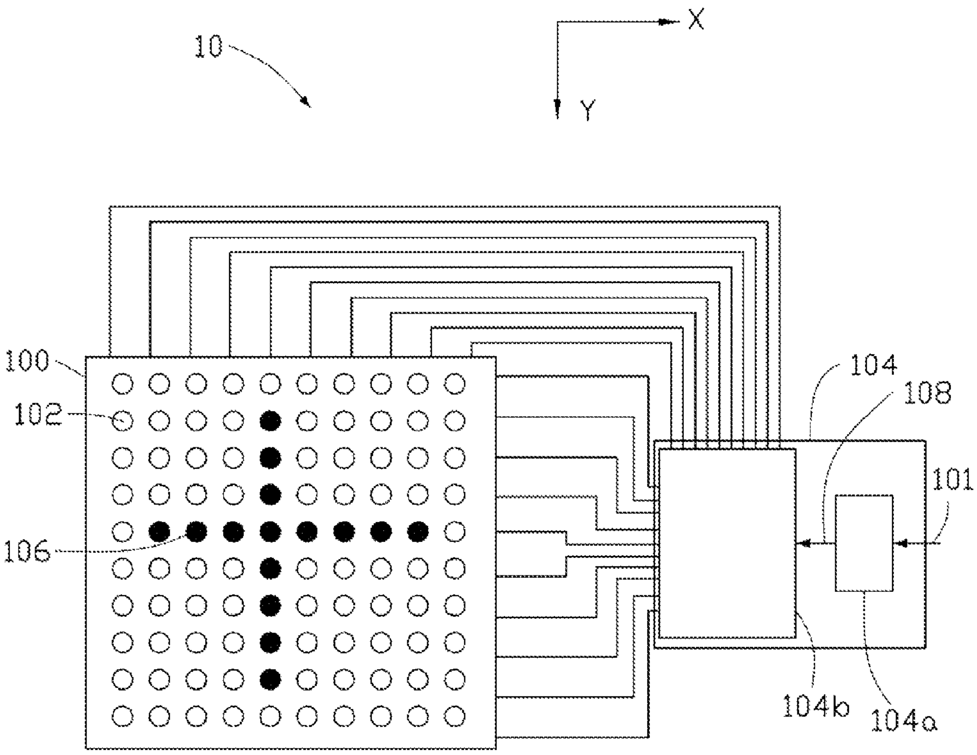
FIG. 1 is a schematic view of one embodiment of a field emission display.

According to one embodiment, a field emission display 10 as illustrated in FIG. 1 includes a panel 100 and a control unit 104. The panel 100 has a number of pixel units 102. The control unit 104, which electrically connects to the pixel units 102, includes a computing circuit 104*a* and a drive circuit 104*b*.

Figure 2:
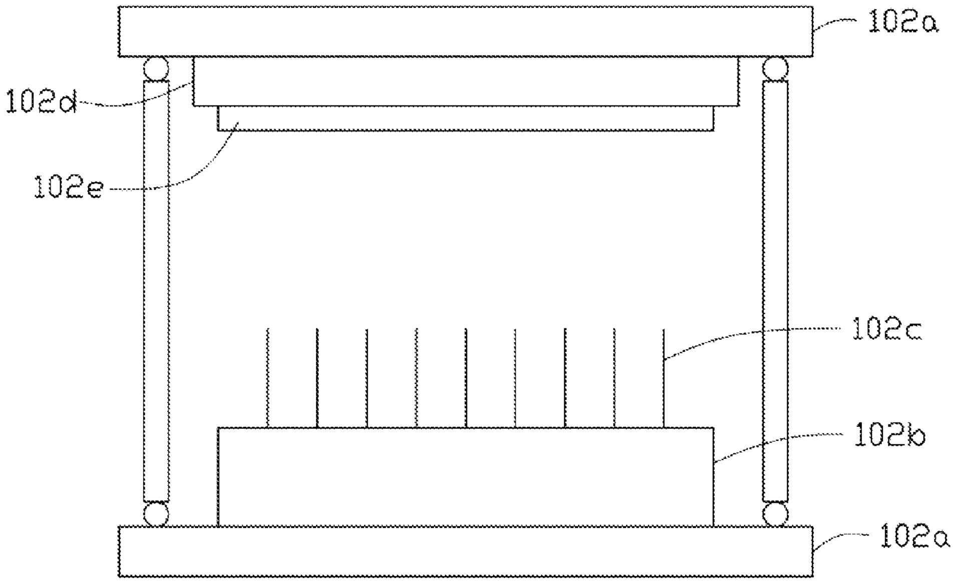
FIG. 2 is a schematic view of one embodiment of a pixel of the field emission display shown in FIG. 1.

As shown in the FIG. 2, each of the pixel units 102 includes two substrates 102*a*, a cathode 102*b*, an emitter 102*c*, an anode 102*d*, and a fluorescent layer 102*e*. The emitter 102*c* electrically connects to the cathode 102*b*. The anode 102*d* electrically connects to the fluorescent layer 102*e*. When the pixel unit 102 operates, the cathode 102*b* provides an electrical potential to the emitter 102*c*. The emitter 102*c* emits electrons according to the electrical potential. The anode 102*d* also provides an electrical potential to accelerate the emitted electrons to bombard the fluorescent layer 102*e* for luminance. Each of the pixel units 102 can include a red sub-pixel, a green sub-pixel, and a blue sub-pixel for the field emission display 10 to display color images. More specifically, each of the pixel units 102 includes a red fluorescent layer, a green fluorescent layer, and a blue fluorescent layer to respectively form the red sub-pixel, the green sub-pixel, and the blue sub-pixel.

The pixel units 102 of the panel 100 can be arranged in a matrix. In one embodiment shown in FIG. 1, there are ten rows of ten pixel units 102 arranged substantially along an X direction at a regular interval forming ten columns of ten pixel units 102 arranged substantially along a Y direction at a regular interval. Thus, there are one hundred pixel units 102 arranged in the panel 100.

When receiving a signal 101 from an objective image 106, the computing circuit 104*a* processes the signal 101 of the objective image 106 and sends a command 108 to the drive circuit 104*b*. The drive circuit 104*b* receives and processes the command 108 from the computing circuit 104*a* and then drives the panel 100 to display the objective image 106.

More specifically, the computing circuit 104*a* selects a part of the pixel units 102. A number of the pixel units 102 that correspond to the objective image 106 are selected by the computing circuit 104*a*. The objective image 106 can be a character, a frame, or a number of frames. The number of the pixel units 102 to which the objective image 106 corresponds, is relative to the number of the pixels of the panel 100. The more the pixel units in the panel 100, the more the pixel units 102 can correspond to the objective image 106.

For example, in FIG. 1, the objective image 106 is a "+" character disposed in a center of the panel 100. There are eight pixel units 102 arranged substantially along the X direction, and eight pixel units 102 arranged substantially along the Y direction, with a common pixel unit 102 at the intersection of the X and Y directed pixel units. Thus, the number of the pixel units 102 corresponding to the objective image 106 is fifteen.

Furthermore, the computing circuit 104*a* selects and divides the pixel units 102 into a number of pixel unit groups. If the objective image 106 has a smaller number of pixel units 102, each of the pixel unit groups may only include one pixel unit 102. If the objective image 106 has a greater number of pixel units 102, each of the pixel unit groups can include a number of pixel units 102.

In detail, when each of the pixel unit groups includes more than one pixel unit 102, the pixel units 102 can be disposed in an interlaced pattern or contiguously in one direction. The computing circuit 104*a* further selects and computes the illumination of each of the pixel units 102, and then divides the pixel units 102 into the pixel unit groups according to the illumination of each of the pixel units 102. Thus, illumination of each of the pixel unit groups can be the same.

In one embodiment, each of the pixel unit groups includes a pixel unit 102. Thus, there are fifteen pixel unit groups corresponding to the objective image 106. The drive circuit 104*b* scans the pixel unit groups to make the pixel unit groups sequentially work to satisfy an equation T<=t1+t2, wherein T is a total working time period of the pixel unit groups, t1 is an afterglow period, of the fluorescent layer 102*e* of the pixel unit 102 of each of the pixel unit groups, and t2 is a time period of persistence of vision of human eyes. When the pixel unit groups sequentially work according to the equation T<=t1+t2, the last pixel unit group will illuminate along with the afterglow of the first pixel unit group. Thus, the panel 100 can display the objective image 106. The control unit 104 scans the plurality of pixel unit groups by a pulse voltage so that the plurality of pixel unit groups sequentially work. Because the pulse time of the pulse voltage is much short, the work time of the plurality of pixel unit groups can be omitted. When the control unit 104 makes one of the plurality of pixel unit groups work, all pixel units 102 of the one of the plurality of pixel unit groups luminance simultaneously. Because of the afterglow period of the fluorescent layer 102*e* and the time period of persistence of vision of human eyes, the plurality of pixel unit groups sequentially work and satisfy the equation T<=t1+t2, when the last one of the plurality of pixel unit groups luminance, the human brain still maintain the image of the first one of the plurality of pixel unit groups. Thus, human can see a full image of the objective image 106. Because the plurality of pixel unit groups sequentially works, at each time point, only one of the plurality of pixel unit group is works, that reduce the amount of gas generated from fluorescent layer 102*e* of the field emission display 10.

The afterglow period t1 of the fluorescent layer 102*e* of each of the pixel units 102 can be in a range from about 1 millisecond to about 100 milliseconds. The time period of persistence of vision t2 can be in a range from about 0.1 seconds to about 0.4 seconds. In one embodiment, the afterglow period t1 of the fluorescent layer 102*e* of each of the pixel units 102 is about 0.05 seconds, and the time period of persistence of vision t2 is about 0.1 seconds. Thus, the time period T is about 0.15 seconds.

Figure 3:
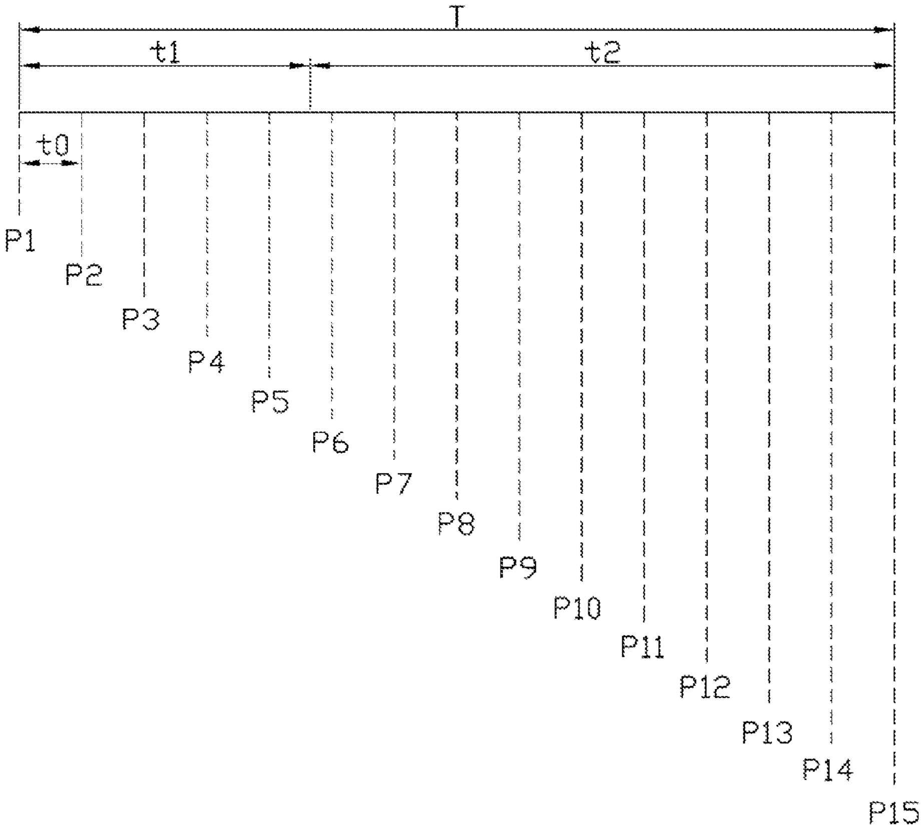
FIG. 3 is a time relationship diagram of pixel groups of the field emission display shown in FIG. 1.

As shown in FIG. 3, the pixel unit groups P1-P15 corresponding to the objective image 106 sequentially work. A time period between two adjacent working pixel unit groups satisfies an equation $$t0 = \frac{T}{(N-1)},$$

wherein N is the number of the pixel unit groups, and t0 is the time period between two adjacent working pixel unit groups. In one embodiment, T is about 0.15 seconds, and N is 15. Thus, the time period t0 between two adjacent working pixel unit groups is about 0.01 seconds.

Specifically, if the objective image 106 has a frame, the pixel unit groups P1-P15 will continuously sequentially work so that the panel 100 displays the static objective image 106 having the frame. An interval between every two pixel unit groups P1-P15 is less than a formula, $$\text{interval} < \frac{(t1 + t2)}{(N-1)}.$$

In one embodiment, t1 is about 0.05 seconds, t2 is about 0.1 seconds, and N is 15. Thus, the interval between every two pixel unit groups P1-P15 is about 0.01 seconds.

If the objective image 106 has a number of frames, the pixel unit groups P1-P15 sequentially work to satisfy an equation $$T <= \frac{1}{24}$$

such that the panel 100 displays the dynamic objective image 106 having the frames. In other words, the panel 100 displays the dynamic objective image 106 having the frames at a rate of about 24 frame per second. In one embodiment, a time period between two adjacent working pixel unit groups corresponding to the Mth frame of the dynamic objective image 106 is less than a formula $$\frac{1}{24} \times (Nm - 1),$$

wherein M is a positive integer, and Nm is the number of the pixel unit groups corresponding to the Mth frame of the dynamic objective image 106.

Figure 4:
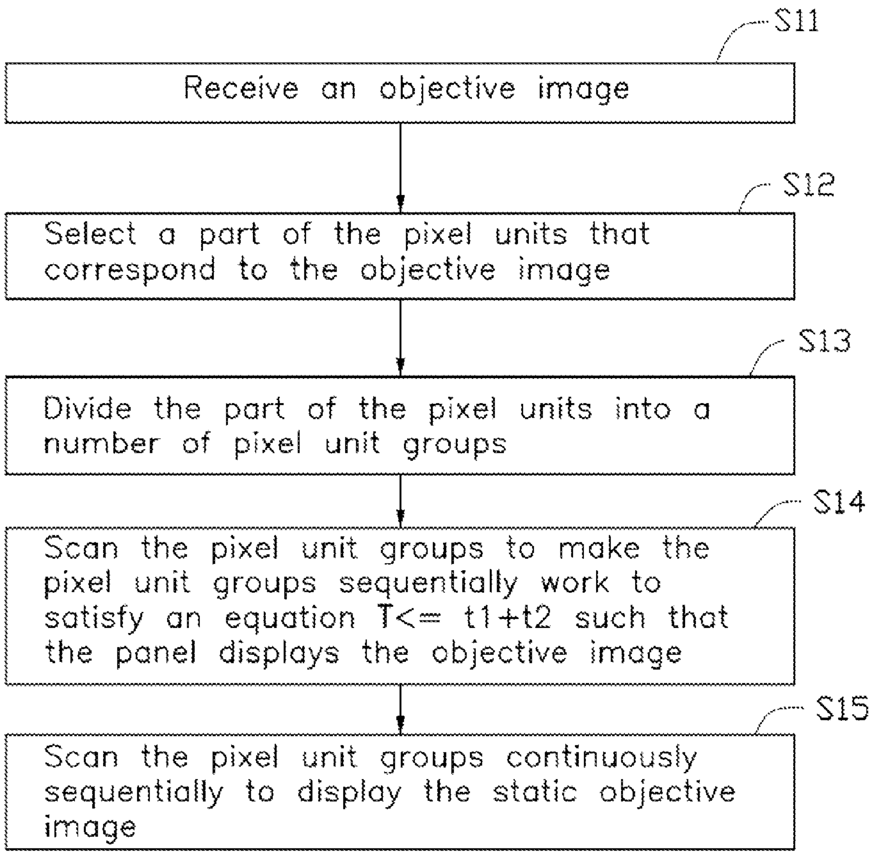
FIG. 4 is a flowchart of one embodiment of a drive method of the field emission display shown in FIG. 1.

According to one embodiment, a drive method of the field emission display 10 as illustrated in FIG. 4 includes the steps of:

S11: receiving an objective image 106;

S12: selecting a part of the pixel units 102 that correspond to the objective image 106;

S13: dividing the selected pixel units 102 into a number of pixel unit groups;

S14: scanning the pixel unit groups to make the pixel unit groups sequentially work to satisfy an equation T<=t1+t2; and S15: scanning the pixel unit groups to make the pixel unit groups continuously and sequentially so that the panel 100 displays the static objective image 106.

Figure 5:
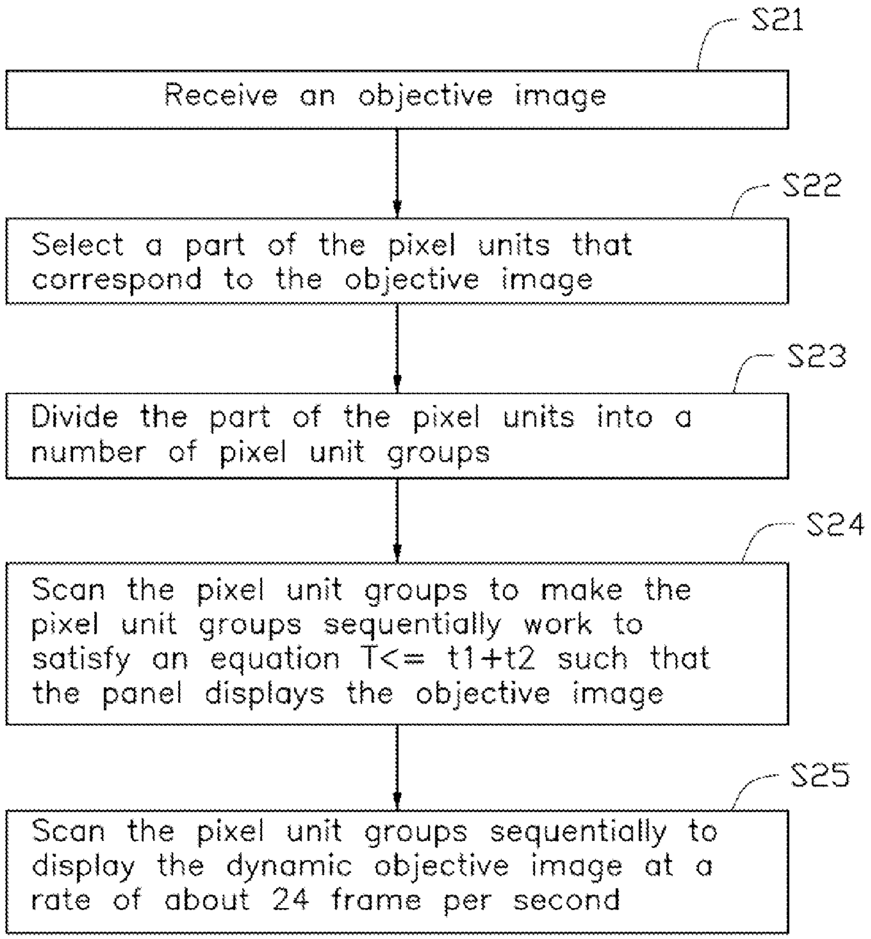
FIG. 5 is a flowchart of another embodiment of a drive method of the field emission display shown in FIG. 1.

According to another embodiment, another drive method of the field emission display 10 as illustrated in FIG. 5 includes the steps of:

S21: receiving an objective image 106;

S22: selecting a part of the pixel units 102 that correspond to the objective image 106;

S23: dividing the selected pixel units 102 into a number of pixel unit groups;

S24: scanning the pixel unit groups to make the pixel unit groups sequentially work to satisfy an equation T<=t1+t2; and S25: scanning the pixel unit groups to make the pixel unit groups sequentially work at a rate of about 24 frame per second such that the panel 100 displays the dynamic objective image 106.

Accordingly, the present disclosure is capable of providing a FED, which scans a number of pixel unit groups to sequentially work to display an image. The pixel unit groups can sequentially work for luminance such that there is only one pixel unit group enabled at one time so the amount of gas generated by the pixel units of the field emission display can be efficiently decreased. Thus, the field emission display can have a long service life and high display performance It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

It is also to be understood that above description and the claims drawn to a method may include some indication in reference to certain steps. However, the indication used is only to be viewed for identification purposes and not as a suggestion as to an order for the steps.

What is claimed is:

1. A drive method for a field emission display, the field emission display comprising a panel and a control unit, the panel having a plurality of pixel units, each of the plurality of pixel units having at least one fluorescent layer and an emitter, the control unit electrically connecting to the plurality of pixel units, the drive method comprising steps of:

- receiving an objective image;
- selecting a part of the plurality of pixel units corresponding to the objective image;
- dividing the part of the plurality of pixel units into a plurality of pixel unit groups, wherein each of the plurality of pixel unit groups comprises at least one pixel unit; and
- scanning the plurality of pixel unit groups to make the plurality of pixel unit groups sequentially work such that the panel displays the objective image, wherein the plurality of pixel unit groups satisfies an equation T<=t1+t2 when operational, wherein T is a total working time period of the plurality of pixel unit groups, t1 is an afterglow period of the at least one fluorescent layer, and t2 is a time period of persistence of vision and in a range from about 0.1 seconds to about 0.4 seconds.

2. The drive method as claimed in claim 1, wherein the step of scanning the plurality of pixel unit groups further comprises a step of enabling the emitter of the at least one pixel unit to emit electrons to bombard the at least one fluorescent layer of the same for luminance such that the panel displays the objective image.

3. The drive method as claimed in claim 1, wherein the objective image has a frame, the plurality of pixel unit groups continuously and sequentially work so that the panel displays the frame, and an interval between two pixel unit groups is less than $$\frac{(t1+t2)}{(N-1)},$$

wherein N is a number of the plurality of pixel unit groups.

4. The drive method as claimed in claim 1, wherein the objective image has a plurality of frames, and the plurality of pixel unit groups sequentially work to satisfy an equation $$T <= \frac{1}{24}$$

second such that the panel displays the plurality of frames at a rate of about 24 frames per second.

5. The drive method as claimed in claim 1, wherein the step of dividing the part of the plurality of pixel units into the plurality of pixel unit groups further comprises a step of computing illumination of each of the part of the plurality of pixel units, wherein the part of the plurality of pixel units are divided into the plurality of pixel unit groups according to the illumination of each of the part of the plurality of pixel units such that the illumination of each of the plurality of pixel unit groups is the same.

6. The drive method as claimed in claim 1, wherein each of the plurality of pixel unit groups comprises the plurality of pixel units disposed in an interlaced pattern.

7. The drive method as claimed in claim 1, wherein each of the plurality of pixel unit groups comprises the plurality of pixel units disposed contiguously.

8. The drive method as claimed in claim 1, wherein the plurality of pixel units are arranged in a matrix.

9. The drive method as claimed in claim 1, wherein t1 is in a range from about 1 millisecond to about 100 milliseconds.

10. A drive method for a field emission display, the field emission display comprising a panel and a control unit, the panel having a plurality of pixel units, each of the plurality of pixel units having at least one fluorescent layer and an emitter, the control unit electrically connecting to the plurality of pixel units, the drive method comprising steps of:

- dividing a part of the plurality of pixel units into a plurality of pixel unit groups according to an objective image received from the control unit; and
- scanning the plurality of pixel unit groups to make the plurality of pixel unit groups sequentially work such that the panel displays the objective image,
- wherein the plurality of pixel unit groups satisfies an equation T<=t1+t2 when operational, wherein T is a total working time period of the plurality of pixel unit groups, t1 is an afterglow period of the at least one fluorescent layer, and t2 is a time period of persistence of vision and in a range from about 0.1 seconds to about 0.4 seconds.

11. The drive method as claimed in claim 10, wherein each of the plurality of pixel unit groups comprises at least one pixel unit, and the step of scanning the plurality of pixel unit groups further comprises a step of enabling the emitter of the at least one pixel unit to emit electrons to bombard the at least one fluorescent layer of the same for luminance such that the panel displays the objective image.

12. The drive method as claimed in claim 10, wherein the objective image has a frame, the plurality of pixel unit groups continuously and sequentially work so that the panel displays the frame, and an interval between two pixel unit groups is less than $$\frac{(t1+t2)}{(N-1)},$$

wherein N is a number of the plurality of pixel unit groups.

13. The drive method as claimed in claim 10, wherein the objective image has a plurality of frames, and the plurality of pixel unit groups sequentially work to satisfy an equation $$T <= \frac{1}{24}$$

second such that the panel displays the plurality of frames at a rate of about 24 frames per second.

14. The drive method as claimed in claim 10, wherein the step of dividing the part of the plurality of pixel units into the plurality of pixel unit groups further comprises the step of computing illumination of each of the part of the plurality of pixel units, wherein the part of the plurality of pixel units are divided into the plurality of pixel unit groups according to the illumination of each of the part of the plurality of pixel units such that the illumination of each of the plurality of pixel unit groups is the same.

15. The drive method as claimed in claim 10, wherein each of the plurality of pixel unit groups comprises the plurality of pixel units disposed in an interlaced pattern.

16. The drive method as claimed in claim 10, wherein each of the plurality of pixel unit groups comprises the plurality of pixel units disposed contiguously.

17. The drive method as claimed in claim 10, wherein the plurality of pixel units are arranged in a matrix.

18. The drive method as claimed in claim 10, wherein t1 is in a range from about 1 millisecond to about 100 milliseconds.

* * * * *